US011915584B2

(12) United States Patent
Vijaya Kumar et al.

(10) Patent No.: US 11,915,584 B2
(45) Date of Patent: Feb. 27, 2024

(54) REVERSE OPERATION DETECTION SYSTEMS AND METHODS

(71) Applicant: GM GLOBAL TECHNOLOGY OPERATIONS LLC, Detroit, MI (US)

(72) Inventors: Vivek Vijaya Kumar, Shelby Township, MI (US); Mohammad Naserian, Windsor (CA); Hariharan Krishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 130 days.

(21) Appl. No.: 17/452,447

(22) Filed: Oct. 27, 2021

(65) Prior Publication Data

US 2023/0125646 A1 Apr. 27, 2023

(51) Int. Cl.
*G08G 1/01* (2006.01)

(52) U.S. Cl.
CPC ......... *G08G 1/0145* (2013.01); *G08G 1/0116* (2013.01); *G08G 1/0133* (2013.01); *G08G 1/0141* (2013.01)

(58) Field of Classification Search
CPC ........................... G08G 1/0145; G08G 1/0116
See application file for complete search history.

(56) References Cited

U.S. PATENT DOCUMENTS 10,235,882 B1 * 3/2019 Aoude .................. G06N 20/10
10,789,848 B2 * 9/2020 Altintas .................. H04W 4/46
11,330,410 B2 * 5/2022 Basu ................ G08G 1/096775
2017/0160091 A1 * 6/2017 Hwang ................ G01C 21/362
2018/0045832 A1 * 2/2018 Ibrahim ............. G01C 21/1654
2018/0126976 A1 * 5/2018 Naserian ............... B60W 10/06
2018/0150086 A1 * 5/2018 Nobukawa ............. G08G 1/164
2018/0257660 A1 * 9/2018 Ibrahim ................ G01S 5/0027
2018/0335781 A1 * 11/2018 Chase .................. G08G 1/0112
2019/0051162 A1 * 2/2019 Malkes ................ G08G 1/0967
2019/0132709 A1 * 5/2019 Graefe ...................... G08G 1/04
2019/0311614 A1 * 10/2019 Yang ...................... G08G 1/052
2019/0311616 A1 * 10/2019 Jin ....................... G05D 1/0297
2019/0325751 A1 * 10/2019 Altintas ............... G05D 1/0077
2019/0385446 A1 * 12/2019 Lepp .................... G08G 1/0145
2019/0392716 A1 * 12/2019 Lu ......................... H04W 4/024
2020/0003907 A1 * 1/2020 Eriksson .................. G08G 1/22
2020/0007661 A1 * 1/2020 Kim ........................ H04L 67/01
2020/0286382 A1 * 9/2020 Avedisov ......... G08G 1/096775
2020/0327804 A1 * 10/2020 Xu ......................... G08G 1/095
2020/0365033 A1 * 11/2020 Cheng .................... G08G 1/161
2021/0125500 A1 * 4/2021 Mortazavi ........ G08G 1/096775
2021/0209937 A1 * 7/2021 Eilertsen .............. G08G 1/0129
2021/0218692 A1 * 7/2021 Higuchi .................. H04W 4/46
(Continued)

*Primary Examiner* — Luis A Martinez Borrero
(74) *Attorney, Agent, or Firm* — Lorenz & Kopf, LLP

(57) ABSTRACT

Systems and method are provided for notifying an operator of a vehicle of reverse operation of a vehicle. In one embodiment, a method includes: receiving, by a processor, at least one of sensor data and vehicle message data, wherein the sensor data is generated by a sensor of an infrastructure system, and wherein the vehicle message data is generated by a remote vehicle; determining, by the processor, a reverse operation of the remote vehicle based on the at least one of the sensor data and the vehicle message data; and generating, by the processor, notification data based on the reverse operation of the remote vehicle.

20 Claims, 7 Drawing Sheets

(56) References Cited

U.S. PATENT DOCUMENTS

| | | | | |
|---|---|---|---|---|
| 2021/0225162 | A1* | 7/2021 | Tao | G08G 1/164 |
| 2021/0233406 | A1* | 7/2021 | Lu | G08G 1/161 |
| 2021/0264793 | A1* | 8/2021 | Shuman | H04W 52/327 |
| 2022/0036728 | A1* | 2/2022 | Ucar | G08G 1/0141 |
| 2022/0044564 | A1* | 2/2022 | Zhang | G08G 1/096725 |
| 2022/0068122 | A1* | 3/2022 | Ucar | H04W 4/46 |
| 2022/0068125 | A1* | 3/2022 | Rodriguez Bravo | G08G 1/096791 |
| 2022/0080977 | A1* | 3/2022 | Ucar | B60W 40/09 |
| 2022/0084405 | A1* | 3/2022 | Zhang | G08G 1/096775 |
| 2022/0116820 | A1* | 4/2022 | Avedisov | G08G 1/0112 |
| 2022/0230537 | A1* | 7/2022 | Whyte | G06V 20/56 |
| 2022/0289240 | A1* | 9/2022 | Ucar | G08G 1/163 |
| 2023/0012196 | A1* | 1/2023 | Abundis Vargas | G08G 1/096716 |
| 2023/0036695 | A1* | 2/2023 | Hwang | B60W 50/08 |
| 2023/0073151 | A1* | 3/2023 | Ucar | B60W 50/14 |
| 2023/0080095 | A1* | 3/2023 | Hwang | G08G 1/0145<br>701/420 |
| 2023/0087496 | A1* | 3/2023 | Hwang | H04W 4/024<br>455/456.1 |
| 2023/0131614 | A1* | 4/2023 | Kreidieh | G06N 7/01<br>701/24 |

* cited by examiner

REVERSE OPERATION DETECTION SYSTEMS AND METHODS

INTRODUCTION

The present disclosure generally relates to vehicles, and more particularly relates to systems and methods for detecting reverse driving operation of a vehicle.

Most all vehicles are capable of driving in a forward and a reverse direction. Typically, vehicle operators operate the vehicle in a forward direction on a road. In some instances, a vehicle operator chooses to operate the vehicle in a reverse direction on the road. For example, when the operator misses an exit on a highway, the operator my choose to stop and operate the vehicle in a reverse direction toward the missed exit. Such operation along the road is undesirable as it may cause disruption to the flow of traffic and/or a collision, and in many cases is unlawful.

Accordingly, it is desirable to provide methods and systems for detection of a vehicle operating in a reverse direction along a road. It is further desirable to provide methods and systems for notifying others of the reverse operation of a vehicle. Furthermore, other desirable features and characteristics of the present invention will become apparent from the subsequent detailed description and the appended claims, taken in conjunction with the accompanying drawings and the foregoing technical field and background.

SUMMARY

Systems and method are provided for notifying an operator of a vehicle of reverse operation of a vehicle. In one embodiment, a method includes: receiving, by a processor, at least one of sensor data and vehicle message data, wherein the sensor data is generated by a sensor of an infrastructure system, and wherein the vehicle message data is generated by a remote vehicle; determining, by the processor, a reverse operation of the remote vehicle based on the at least one of sensor data and vehicle message data; generating, by the processor, notification data based on the reverse operation of the vehicle.

In various embodiments, the vehicle message data includes transmission range data.

In various embodiments, the vehicle message data includes vehicle heading data.

In various embodiments, the vehicle message data includes path history data.

In various embodiments, the sensor data includes camera data generated by a camera of a roadside unit of the infrastructure system.

In various embodiments, the method includes determining a direction of travel of a lane occupied by the remote vehicle, and wherein the determining the reverse operation is further based on the direction of travel.

In various embodiments, the processor is of a roadside unit of an infrastructure system.

In various embodiments, the method includes communicating the notification data to other vehicles by way of a short-range communication protocol.

In various embodiments, the processor is of a second vehicle.

In various embodiments, the method includes communicating the notification data to at least one of a remote transportation system by way of a local area network protocol or a cellular network protocol, and an occupant of the second vehicle by way of a notification device.

In another embodiment, a computer implemented system includes a reverse direction detection module that comprises one or more processors configured by programming instructions encoded in non-transitory computer readable media. The reverse direction detection module is configured to: receive, by the one or more processors, at least one of sensor data and vehicle message data, wherein the sensor data is generated by a sensor of an infrastructure system, and wherein the vehicle message data is generated by a remote vehicle; determine, by the one or more processors, a reverse operation of the remote vehicle based on the at least one of sensor data and vehicle message data; and generate, by the one or more processors, notification data based on the reverse operation of the vehicle.

In various embodiments, the vehicle message data includes transmission range data.

In various embodiments, the vehicle message data includes vehicle heading data.

In various embodiments, the vehicle message data includes path history data.

In various embodiments, the sensor data includes camera data generated by a camera of a roadside unit of the infrastructure system.

In various embodiments, the reverse direction detection module is further configured to determine a direction of travel of a lane occupied by the remote vehicle, and determine the reverse operation further based on the direction of travel.

In various embodiments, the reverse direction detection module is of a roadside unit of an infrastructure system.

In various embodiments, the reverse direction detection module is further configured to communicate the notification data to other vehicles by way of a short-range communication protocol.

In various embodiments, the reverse direction detection module is of a second vehicle.

In various embodiments, the reverse direction detection module is further configured to communicate the notification data to at least one of a remote transportation system by way of a local area network protocol or a cellular network protocol, and an occupant of the second vehicle by way of a notification device.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
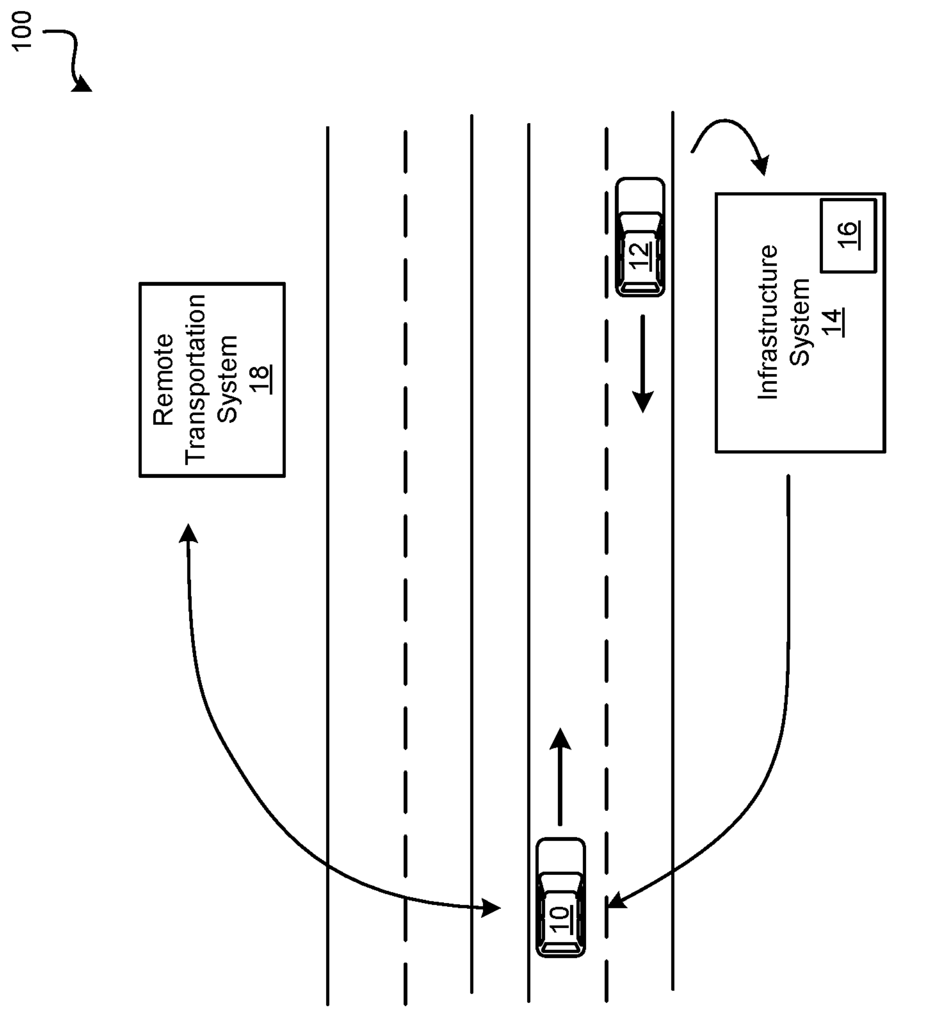
FIG. 1 is a functional block diagram illustrating a reverse direction detection system, in accordance with various embodiments.

With reference to FIG. 1, a reverse direction detection system shown generally at 100 is associated with a plurality of vehicles 10, 12 in accordance with various embodiments. In general, the reverse direction detection system 100 makes use of an infrastructure system 14 of highway connected roadside units to detect reverse driving of the vehicle 12 using, for example, vehicle to everything communications (V2X) and/or data from sensors 16 of the infrastructure system 14. The sensors 16 sense observable conditions of the environment and can include, but are not limited to, optical cameras, thermal cameras, ultrasonic sensors, and/or other sensors.)

In some cases, the vehicle 12 that is operating in a reverse direction is communicatively connected with the infrastructure system 14, for example, via short range communication channels such as, but not limited to, dedicated short-range communications (DSRC) channel, LTE-V2X, C-V2X, etc. In such cases, the vehicle's heading, transmission range (PRNDL), and/or point history obtained from messages generated by the vehicle 12 can be used to detect the reverse direction operation.

In cases when the vehicle 12 is not communicatively connected with the infrastructure system 14, data from the sensors 16 of the infrastructure system 14 is used to detect the reverse direction operation. For example, data from a camera can be used to determine the reverse operation.

In various embodiments, the detection operations can be performed by the infrastructure system 14 and warnings of the detection can be communicated to other vehicles using, for example, vehicle to infrastructure (V2I) Road Safety Messages (RSM) that are broadcast to surrounding vehicles 10 and/or communicated directly to surrounding vehicles 10 using the short-range communication channels. In various other embodiments, the detection operations can be performed by the other vehicle 12 and warnings of the detection can be communicated to other vehicles through a remote transportation system 18 (e.g., a back office) that is communicatively coupled to the other vehicles 10 via wireless local area network (WLAN) and/or a cellular network. In various embodiments, the remote transportation system 18 includes one or more backend server systems, which may be cloud-based, network-based, or resident at the particular campus or geographical location serviced by the remote transportation system 18. The remote transportation system 18 can be manned by a live advisor, or an automated advisor, or a combination of both. The remote transportation system 18 can communicate with the user devices 54 and/or the vehicles 10, 12 to communicate messages about reverse direction operation.

Figure 2:
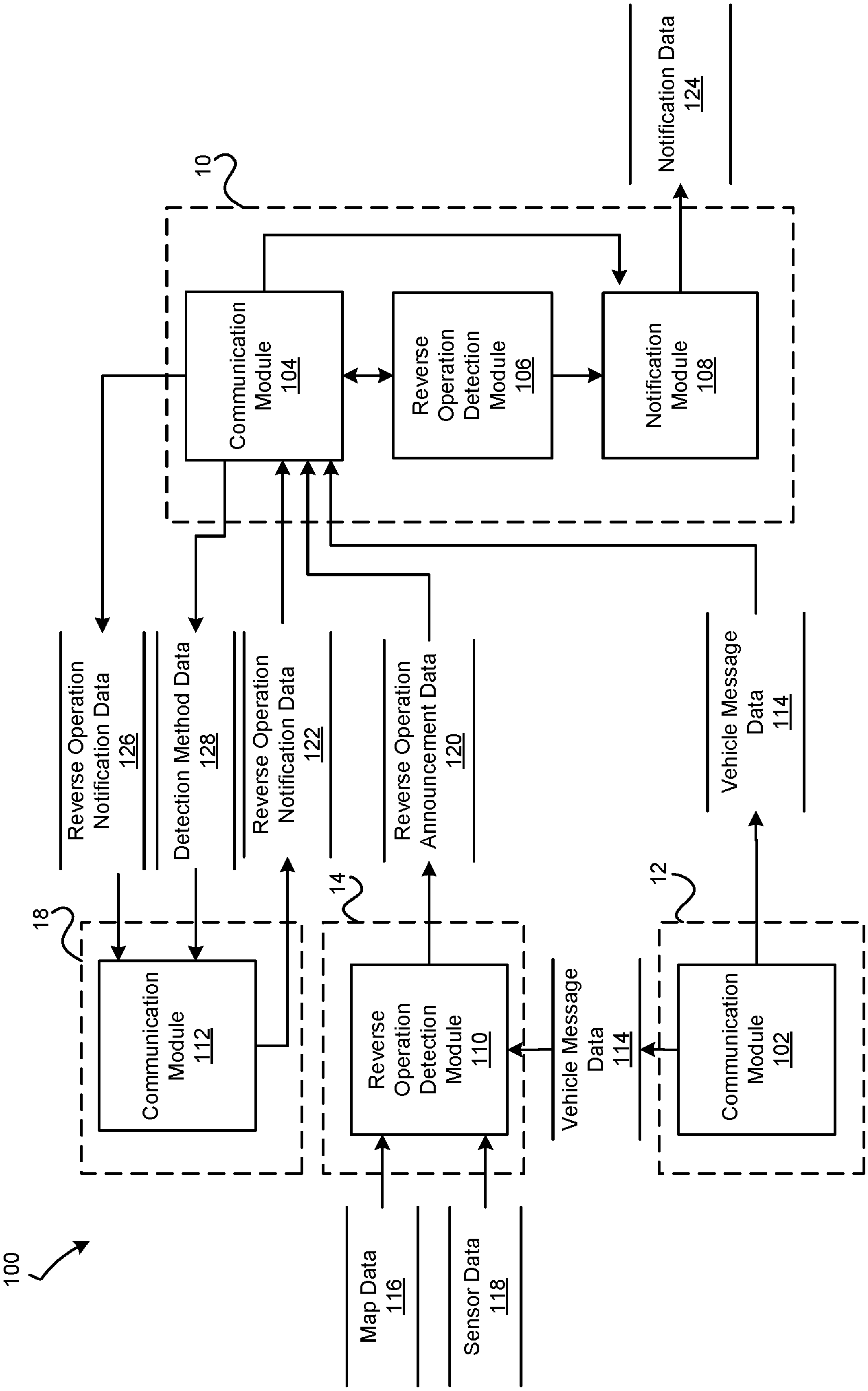
FIG. 2 is a dataflow diagram illustrating the reverse direction detection system, in accordance with various embodiments.
Figure 3:
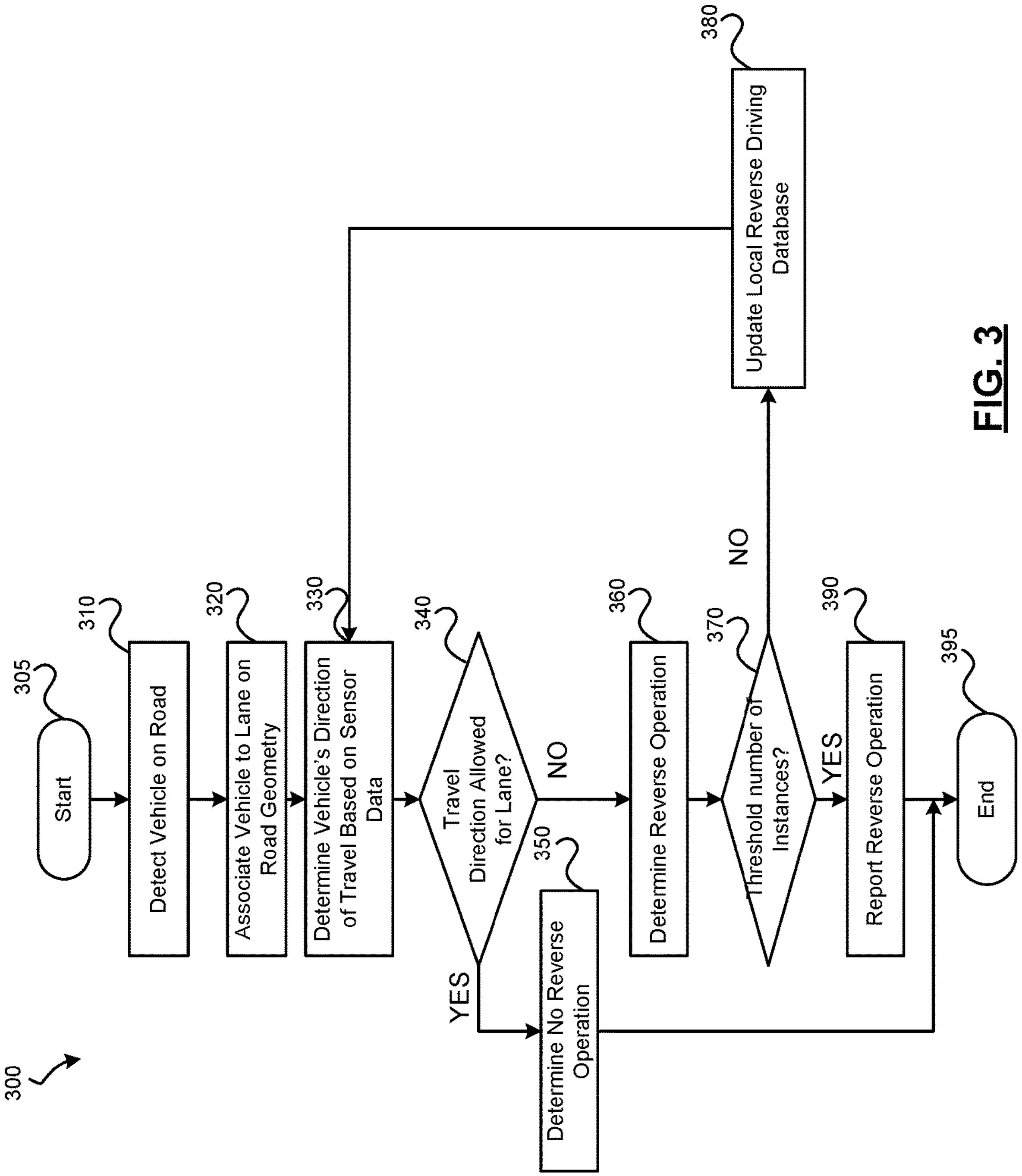
FIGS. 3, 4, 5, and 6 are flowcharts illustrating reverse direction detection methods that may be performed by the reverse direction detection system, in accordance with various embodiments

With reference now to FIG. 2, a dataflow diagram illustrates the reverse direction detection system 100 in accordance with various embodiments. As shown in more detail with regard to FIG. 2 and with continued reference to FIG. 1, the reverse direction detection system 100 may be implemented as one or more modules configured to perform one or more methods by way of, for example, a processor. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The processor can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the module. As can be appreciated, the modules 102-112 shown can be combined and/or further partitioned in various embodiments to provide the functionality described herein. Furthermore, inputs to the modules 102-112 may be received from other modules or data storage devices (not shown). Furthermore, the inputs might also be subjected to preprocessing, such as sub-sampling, noise-reduction, normalization, feature-extraction, missing data reduction, and the like.

In various embodiments, the reverse direction detection system 100 includes one or more modules implemented on the vehicles 10, 12, the infrastructure system 14, and/or the remote transportation system 18. For example, the vehicle 12 includes a communication module 102; the vehicle 10 includes a communication module 104, a reverse operation detection module 106, and a notification module 108; the infrastructure system includes a reverse detection module 110; and the remote transportation system 18 includes a communication module 112.

In various embodiments, the communication module 102 of the vehicle 12 communicates message data 114 including vehicle information such as, but not limited to, transmission range data (PRNDL), heading data, past history points data, lane location data, etc. In various embodiments, the message data 114 can be obtained from a communication bus of the vehicle 12.

In various embodiments, the reverse detection module 110 of the infrastructure system 14 receives the message data 114, map data 116, and/or sensor data 118. The map data 116 can include information about the roadway in proximity to the infrastructure system 14. For example, the map data 116 can include a number of lanes, a travel direction of the lanes, etc. The map data 116 can be received from a storage device of the infrastructure system 14. The sensor data 118 can include real-time sensed information from the roadway in proximity to the infrastructure system 14. For example, the sensor data 118 can include image frame data generated by a camera.

The reverse detection module 110 performs reverse operation detection methods on the received data to detect when the vehicle 12 is reverse operating. Various embodiments of the reverse operation detection methods are described in more detail with regard to FIGS. 3, 4, 5, and 6. Upon detection of reverse operation by the vehicle 12, the reverse detection module 110 communicates reverse operation announcement data 120 to the communication module 104 of the vehicle 10 (e.g., by way of broadcast or direct communication).

In various embodiments, the communication module 104 receives the reverse operation announcement data 120 from the reverse detection module 110. The communication module 104 passes the reverse operation announcement data 120 to the notification module 108. The notification module 108 selectively notifies or warns an operator and/or occupant of the vehicle 10 via notification data 124 (e.g., data that activates a notification device of the vehicle 10). The communication module 104 communicates reverse operation notification data 126 indicating the detected reverse operation, and detection method data 128 indicating the detection was by way of announcement data to the communication module 112 of the remote transportation system 18. The data 126, 128 is then used to communication reverse operation notification data 122 to other vehicles.

In various embodiments, the communication module 104 receives reverse operation notification data 122 from the communication module 112 of the remote transportation system 18. The communication module may generate the reverse operation notification data 122 in response to another vehicle detecting reverse operation. The communication module 104 passes the reverse operation notification data 122 to the notification module 108. The notification module 108 selectively notifies or warns an operator and/or occupant of the vehicle 10 via notification data 124 (e.g., data that activates a notification device of the vehicle 10).

In various embodiments, the communication module 104 receives the vehicle message data 114 and passes the vehicle message data 114 to the reverse operation detection module 106. The reverse operation detection module 106 performs reverse operation detection methods on the vehicle message data 114 to detect when the vehicle 12 is reverse operating and sets a reverse operation status. Various embodiments of the reverse operation detection methods are described in more detail with regard to FIGS. 3, 4, 5, and 6. Upon detection of reverse operation by the vehicle 10, the reverse operation detection module 106 passes the reverse operation status to the notification module 108. The notification module 108 selectively notifies or warns an operator and/or occupant of the vehicle 10 via notification data 124 (e.g., data that activates a notification device of the vehicle 10).

In various embodiments, the reverse operation detection module 106 passes the reverse operation status to the communication module 104. The communication module 104 communicates reverse operation notification data 126 indicating the detected reverse operation, and detection method data 128 indicating the detection was by way of vehicle message data to the communication module 112 of the remote transportation system 18. The data 126, 128 is then used to communication reverse operation notification data 122 to other vehicles.

Referring now to FIGS. 3, 4, 5, and 6, and with continued reference to FIGS. 1-2, flowcharts illustrate methods 300, 400, 600, and 800 that can be performed by the reverse direction detection system 100 of FIGS. 1-2 in accordance with the present disclosure. As can be appreciated in light of the disclosure, the order of operation within the methods is not limited to the sequential execution as illustrated in FIGS. 3, 4, 5, and 6 but may be performed in one or more varying orders as applicable and in accordance with the present disclosure. In various embodiments, the methods 300, 400, 600, and 800 can be scheduled to run based on one or more predetermined events, and/or can run continuously during operation of the vehicle 10 or the infrastructure system 14.

In various embodiments, the method 300 may begin at 305. Thereafter, at 310, a vehicle is detected on the road, for example, based on the sensor data 118. The detected vehicle is associated with a lane of the roadway indicated by the map data 116 at 320. The direction of travel of the detected vehicle is determined based on the sensor data 118 at 330. If the direction of travel is permitted for the lane (e.g., as indicated by the map data 116), then it is determined that the vehicle is not operating in reverse at 350 and the method 300 may end at 395.

If, however, the direction of travel is not permitted for the lane at 340, then it is determined that the vehicle is operating in reverse at 360. If the number of instances of the determination exceeds a predefined threshold at 370, the reverse operation is reported, for example, by way of the announcement data 120, or the notification data 124, 126, and 128 at 390 and the method 300 may end at 395.

If, however, the number of instances does not exceed the predefined threshold at 370, an instance count is incremented and stored in a datastore at 380 and the method 300 continues until the instances exceeds the threshold at 370 or the travel direction is allowed at 340.

Figure 4:
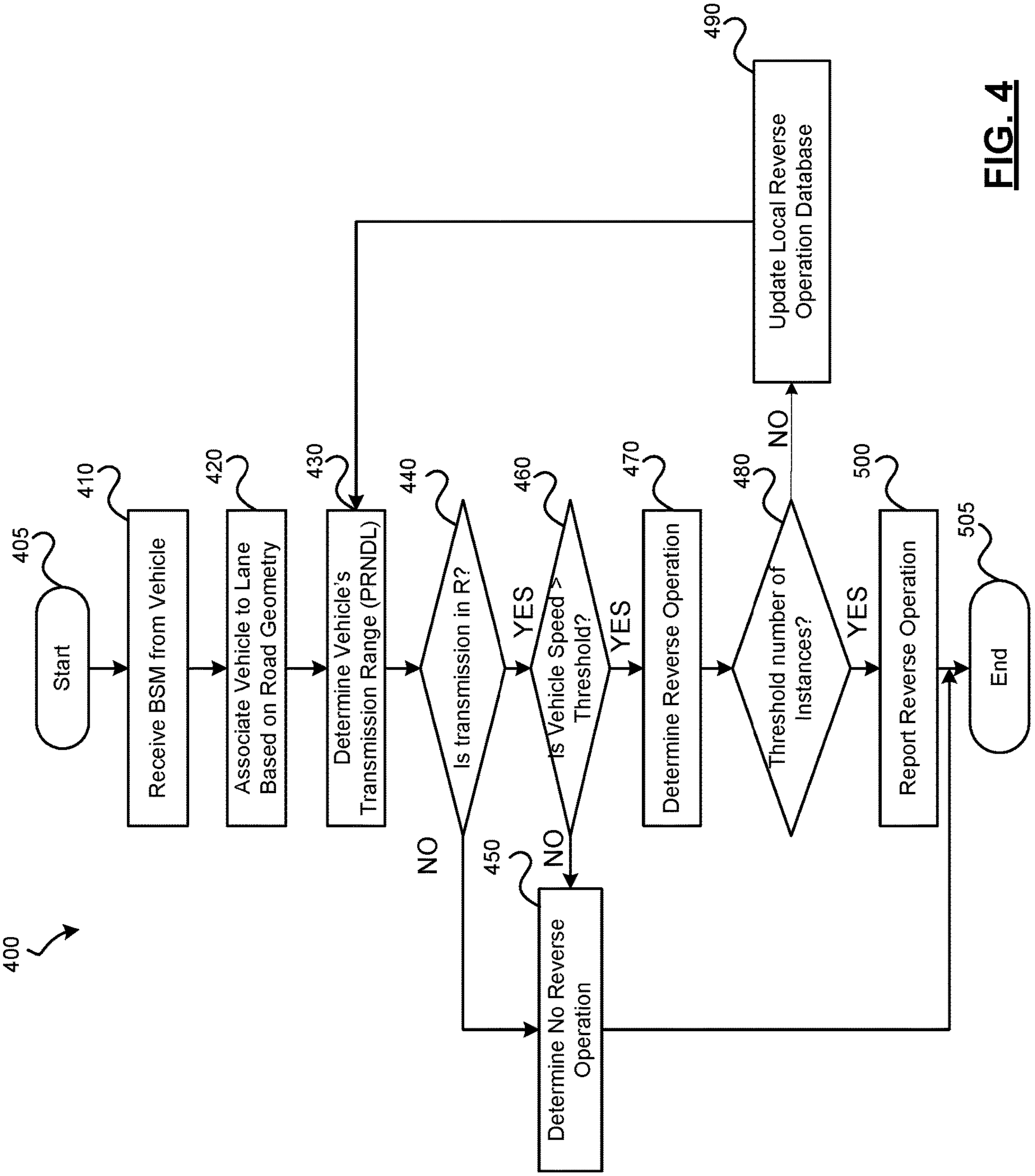

With reference now to FIG. 4 and with continued reference to FIGS. 1-2, in various embodiments, the method 400 may begin at 405. and vehicle message data 114 is received from a vehicle at 410. The vehicle is associated with a lane of the roadway indicated by the map data 116 at 420. The transmission range of the vehicle is determined from the vehicle message data 114 at 430. If the transmission is not operating in reverse range at 440, then it is determined that the vehicle is not operating in reverse at 450 and the method 400 may end at 505.

If, however, the transmission is operating in reverse at 440, then the vehicle speed is evaluated at 460. If it is determined that the vehicle speed is not greater than a predefined threshold at 460, then it is determined that the vehicle is not operating in reverse at 450 and the method 400 may end at 505. If it is determined that the vehicle speed is greater than the predefined threshold at 460, then it is determined that the vehicle is operating in reverse at 470.

If the number of instances of the determination exceeds a predefined threshold at 480, the reverse operation is reported, for example, by way of the announcement data 120, or the notification data 124, 126, and 128 at 500 and the method 400 may end at 505.

If, however, the number of instances does not exceed the predefined threshold at 480, an instance count is incremented and stored in a datastore at 490 and the method 400 continues until the instances exceeds the threshold at 480 or the transmission range is no longer reverse at 440.

Figure 5:
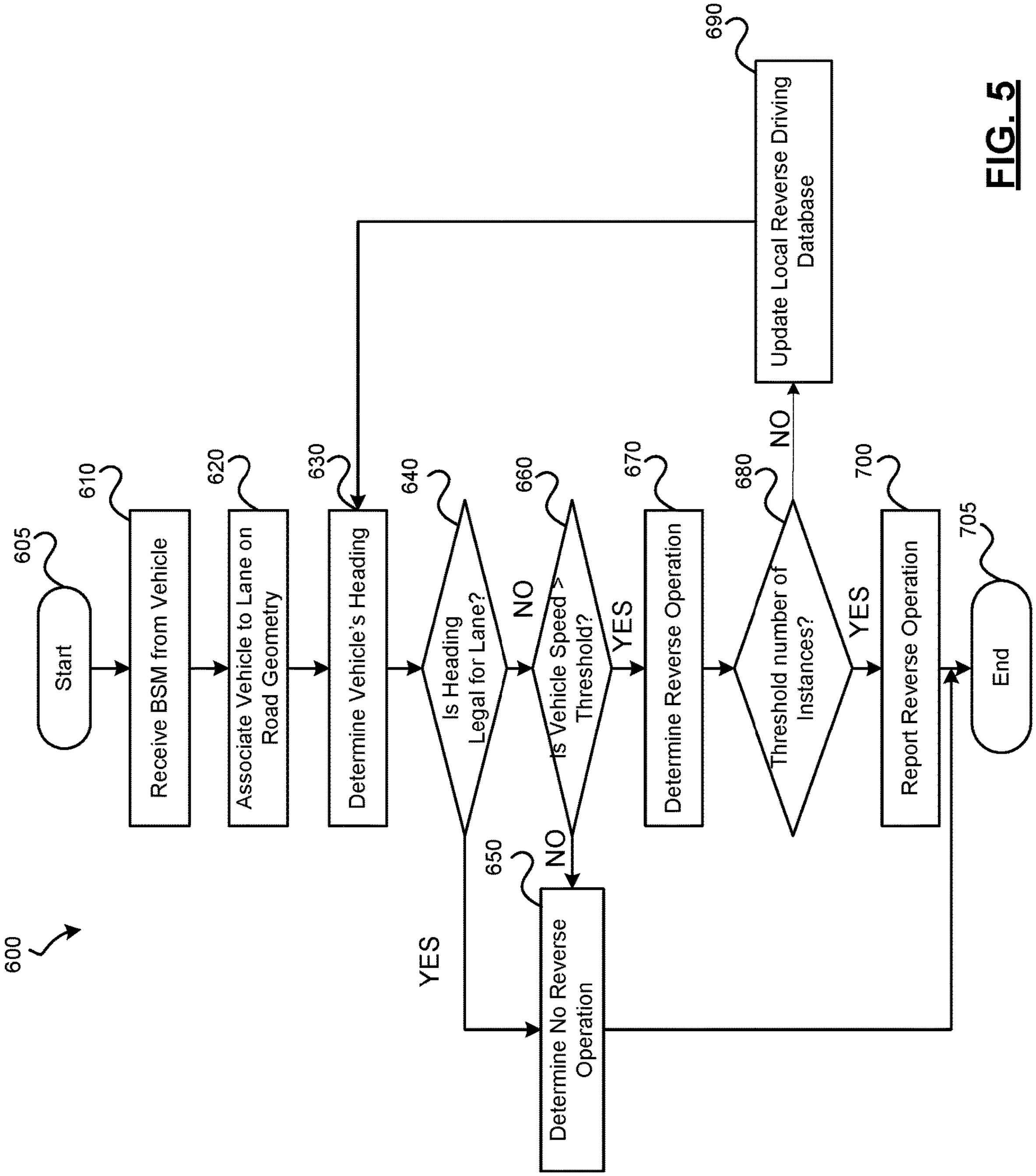

With reference now to FIG. 5 and with continued reference to FIGS. 1-2, in various embodiments, the method 600 may begin at 605. and vehicle message data 114 is received from a vehicle at 610. The vehicle is associated with a lane of the roadway indicated by the map data 116 at 620. The heading of the vehicle is determined from the vehicle message data 114 at 630. If the heading is legal for the associated lane (e.g., based on the map data 116) at 640, then it is determined that the vehicle is not operating in reverse at 650 and the method 600 may end at 705.

If, however, the heading is not legal for the associated lane at 640, then the vehicle speed is evaluated at 660. If it is determined that the vehicle speed is not greater than a predefined threshold at 660, then it is determined that the vehicle is not operating in reverse at 650 and the method may end at 705. If it is determined that the vehicle speed is greater than the predefined threshold at 660, then it is determined that the vehicle is operating in reverse at 670.

If the number of instances of the determination exceeds a predefined threshold at 680, the reverse operation is reported, for example, by way of the announcement data 120, or the notification data 124, 126, and 128 at 500 and the method 600 may end at 705.

If, however, the number of instances does not exceed the predefined threshold at 680, an instance count is incremented and stored in a datastore at 690 and the method 600 continues until the instances exceeds the threshold at 680 or the heading is legal at 640.

Figure 6:
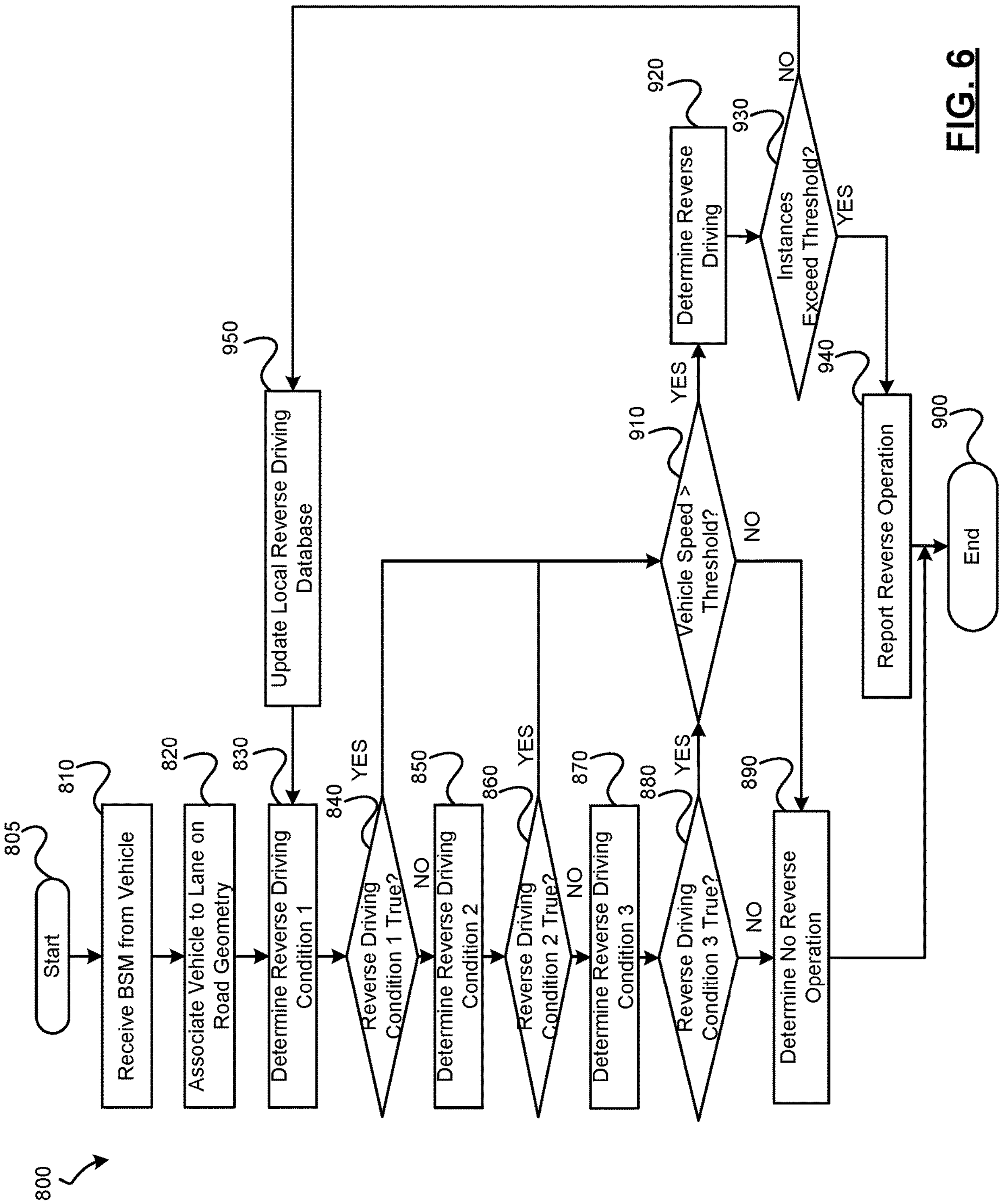

With reference now to FIG. 6 and with continued reference to FIGS. 1-2, in various embodiments, the method 800 may begin at 805. and vehicle message data 114 is received from a vehicle at 810. The vehicle is associated with a lane of the roadway indicated by the map data 116 at 820. Thereafter, the vehicle's point history determined from the sensor data 118 is evaluated at 840-880.

Figure 7:
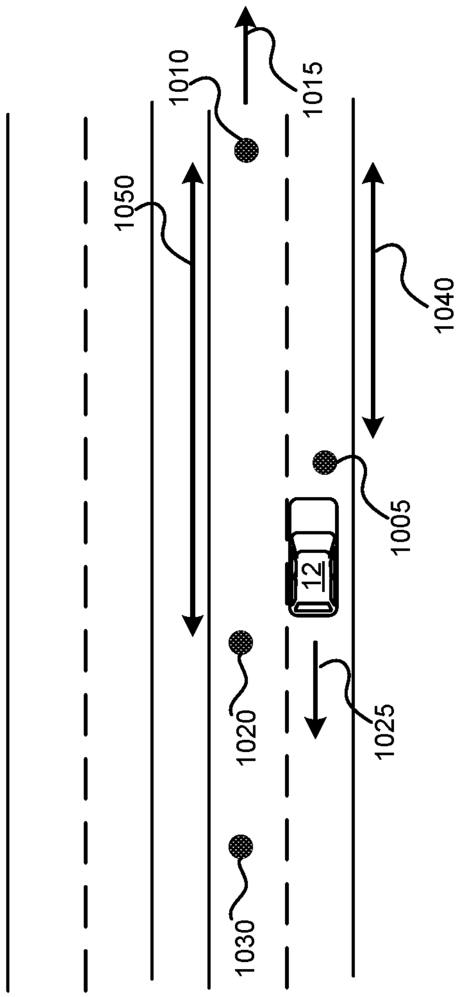
FIG. 7 is an illustration of point history data and conditions used to determine reverse operation of a vehicle.

For example, as shown in more detail in FIG. 7, point history indicating points i 1005, point i-1 1010, point i-2 1020, and point i-3 1030 along with headings 1015, 1025 are received. Distance D1 1040 between point i 1005 and point i-1 1010 and distance D2 1050 between point i-1 1010 and point i-2 1020 are determined. From this data, condition 1 (a heading difference at point i-1 is greater than a threshold), condition 2 (the distance D2 is less than the distance D1 plus the distance D2), and condition 3 (the distance D3 equals the distance D1 minus the distance D3) can be determined.

With reference back to FIG. 6, the first condition of the vehicle is determined from the sensor data 118 at 830, a second condition of the vehicle is determined from the sensor data 118 at 850, and a third condition of the vehicle is determined from the sensor data 118 at 870. If the first condition, the second condition, and the third condition are not true at 840, 860, and 880, it is determined that the vehicle is not operating in reverse at 890 and the method 800 may end at 900.

If any of the first condition, the second condition, and the third condition is true at 840, 860, or 880, then the vehicle speed is evaluated at 910. If it is determined that the vehicle speed is not greater than a predefined threshold at 910, then it is determined that the vehicle is not operating in reverse at 890 and the method 800 may end at 900. If it is determined that the vehicle speed is greater than the predefined threshold at 910, then it is determined that the vehicle is operating in reverse at 920.

If the number of instances of the determination exceeds a predefined threshold at 930, the reverse operation is reported, for example, by way of the announcement data 120, or the notification data 124, 126, and 128 at 940 and the method 800 may end at 900.

If, however, the number of instances does not exceed the predefined threshold at 930, an instance count is incremented and stored in a datastore at 950 and the method 800 continues until the instances exceeds the threshold at 930 or the conditions are not true at 840, 860, and 880.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method, comprising:
- receiving, by a processor, at least one of sensor data and vehicle message data, wherein the sensor data is generated by a sensor of an infrastructure system, and wherein the vehicle message data is generated by a remote vehicle;
- determining, by the processor, point history data from the at least one of sensor data and vehicle message data;
- determining, by the processor, a plurality of point distances, and a heading difference based on the point history data,
- determining, by the processor, a reverse operation of the remote vehicle based on a plurality of conditions that are based on the plurality of point distances and the heading difference; and
- generating, by the processor, notification data based on the reverse operation of the remote vehicle.

2. The method of claim 1, wherein the vehicle message data further includes transmission range data, and wherein the determining the reverse operation is further based on the transmission range data.

3. The method of claim 1, wherein the vehicle message data further includes vehicle heading data, and wherein the determining the reverse operation is further based on the vehicle heading data.

4. The method of claim 1, wherein the sensor data further includes camera data generated by a camera of a roadside unit of the infrastructure system, and wherein the determining the reverse operation is further based on the camera data.

5. The method of claim 1, further comprising determining a direction of travel of a lane occupied by the remote vehicle, and wherein the determining the reverse operation is further based on the direction of travel.

6. The method of claim 1, wherein the processor is of a roadside unit of the infrastructure system.

7. The method of claim 6, further comprising communicating the notification data to other vehicles by way of a short-range communication protocol.

8. The method of claim 1, wherein the processor is of a second vehicle.

9. The method of claim 8, further comprising communicating the notification data to at least one of a remote transportation system by way of a local area network protocol or a cellular network protocol, and an occupant of the second vehicle by way of a notification device.

10. The method of claim 1, wherein the plurality of conditions comprises:

a first condition that is based on the heading difference at a first point of the point history being greater than a threshold, a second condition that is based on a first distance less than a second distance plus the first distance; and a third condition that is based on a third distance equal to the second distance minus the third distance.

11. A computer implemented system, the system comprising:

a reverse direction detection module that comprises one or more processors configured by programming instructions encoded in non-transitory computer readable media, the reverse direction detection module configured to:

receive, by the one or more processors, at least one of sensor data and vehicle message data, wherein the sensor data is generated by a sensor of an infrastructure system, and wherein the vehicle message data is generated by a remote vehicle;

determine, by the one or more processors, point history data from the at least one of sensor data and vehicle message data;

determine, by the one or more processors, a plurality of point distances, and a heading difference based on the point history data, determine, by the one or more processors, a reverse operation of the remote vehicle based on a plurality of conditions that are based on the plurality of point distances and the heading difference; and generate, by the one or more processors, notification data based on the reverse operation of the remote vehicle.

12. The computer implemented system of claim 11, wherein the vehicle message data further includes transmission range data, and wherein the determining the reverse operation is further based on the transmission range data.

13. The computer implemented system of claim 11, wherein the vehicle message data includes further vehicle heading data, and wherein the determining the reverse operation is further based on the vehicle heading data.

14. The computer implemented system of claim 11, wherein the sensor data further includes camera data generated by a camera of a roadside unit of the infrastructure system, and wherein the determining the reverse operation is further based on the camera data.

15. The computer implemented system of claim 11, wherein the reverse direction detection module is further configured to determine a direction of travel of a lane occupied by the remote vehicle, and determine the reverse operation further based on the direction of travel.

16. The computer implemented system of claim 11, wherein the reverse direction detection module is of a roadside unit of the infrastructure system.

17. The computer implemented system of claim 16, wherein the reverse direction detection module is further configured to communicate the notification data to other vehicles by way of a short-range communication protocol.

18. The computer implemented system of claim 11, wherein the reverse direction detection module is of a second vehicle.

19. The computer implemented system of claim 18, wherein the reverse direction detection module is further configured to communicate the notification data to at least one of a remote transportation system by way of a local area network protocol or a cellular network protocol, and an occupant of the second vehicle by way of a notification device.

20. The computer implemented system of claim 11, wherein the plurality of conditions comprises:

a first condition that is based on the heading difference at a first point of the point history being greater than a threshold, a second condition that is based on a first distance less than a second distance plus the first distance; and a third condition that is based on a third distance equal to the second distance minus the third distance.

* * * * *